United States Patent
Chen

(10) Patent No.: US 7,102,637 B2
(45) Date of Patent: Sep. 5, 2006

(54) METHOD OF SEAMLESS PROCESSING FOR MERGING 3D COLOR IMAGES

(75) Inventor: Chia-Lun Chen, Hsinchu Hsien (TW)

(73) Assignee: Industrial Technology Research Institute, Hsien (TW)

( * ) Notice: Subject to any disclaimer, the term of this patent is extended or adjusted under 35 U.S.C. 154(b) by 355 days.

(21) Appl. No.: 10/424,125

(22) Filed: Apr. 28, 2003

(65) Prior Publication Data

US 2004/0125106 A1 Jul. 1, 2004

(30) Foreign Application Priority Data

Dec. 31, 2002 (TW) ............................. 91138080 A

(51) Int. Cl.
*G06T 15/50* (2006.01)
*G09G 5/02* (2006.01)
*G09G 5/00* (2006.01)
*G06K 9/40* (2006.01)

(52) U.S. Cl. ...................... 345/426; 345/589; 345/590; 345/611; 345/629; 382/274

(58) Field of Classification Search ................ 345/426, 345/589, 590, 611, 629; 382/274
See application file for complete search history.

(56) References Cited

U.S. PATENT DOCUMENTS

| | | | | |
|---|---|---|---|---|
| 4,974,073 A * | 11/1990 | Inova | ............................ | 348/38 |
| 5,022,085 A * | 6/1991 | Cok | ............................ | 382/284 |
| 5,136,390 A * | 8/1992 | Inova et al. | ................. | 348/383 |
| 5,428,465 A * | 6/1995 | Kanamori et al. | ........... | 358/518 |
| 5,724,456 A * | 3/1998 | Boyack et al. | ............... | 382/274 |
| 6,128,046 A * | 10/2000 | Totsuka et al. | .............. | 348/590 |
| 6,271,847 B1 | 8/2001 | Shum et al. | | |
| 6,548,800 B1* | 4/2003 | Chen et al. | ............... | 250/208.1 |
| 6,628,327 B1* | 9/2003 | Aoki et al. | ............... | 348/221.1 |
| 6,628,341 B1* | 9/2003 | Staley et al. | ................. | 348/607 |
| 6,885,369 B1* | 4/2005 | Tanahashi et al. | ........... | 345/426 |
| 2001/0020983 A1* | 9/2001 | Lee et al. | .................... | 348/687 |

* cited by examiner

*Primary Examiner*—Ulka Chauhan
*Assistant Examiner*—Roberta Prendergast
(74) *Attorney, Agent, or Firm*—Birch, Stewart, Kolasch and Birch, LLP

(57) ABSTRACT

A method of seamless processing for merging 3D color images is disclosed. By transferring the images to a different color space, it separates the brightness from the color information. The seams are smoothed according to the brightness, and the result is transferred back to the RGB color space. It keeps the colors of the images and does not destroy the original textures.

7 Claims, 9 Drawing Sheets

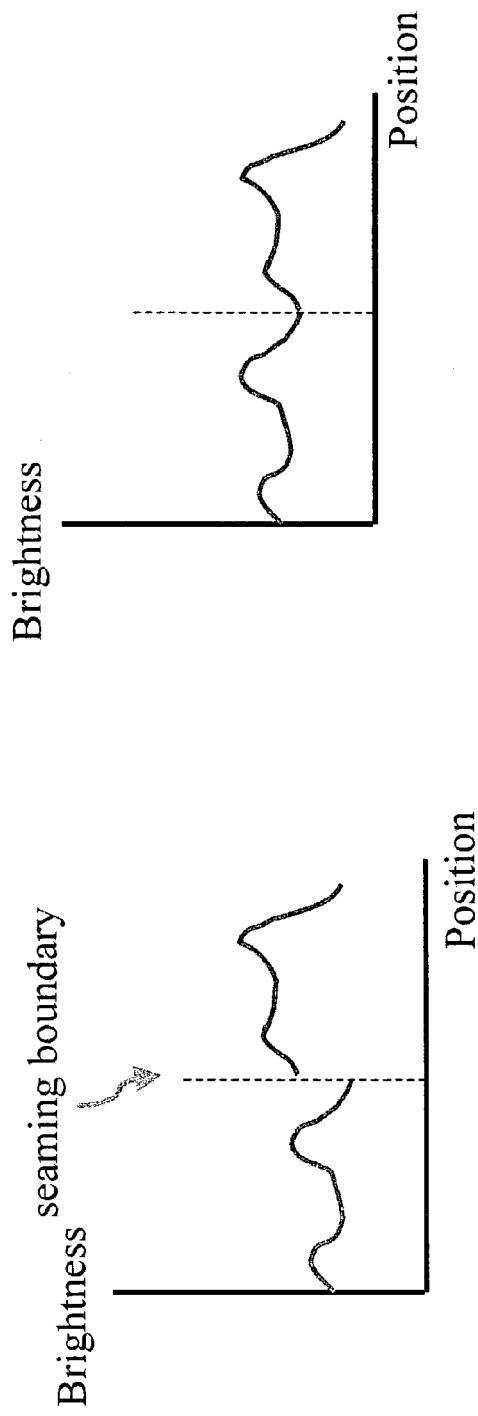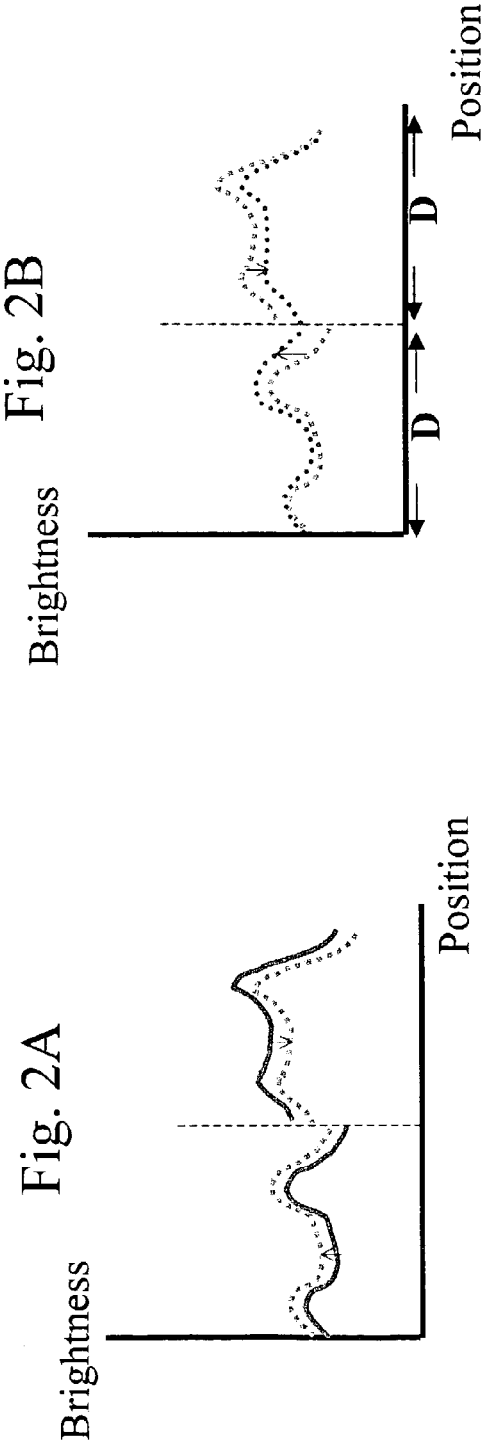

After
Before
Fig. 10

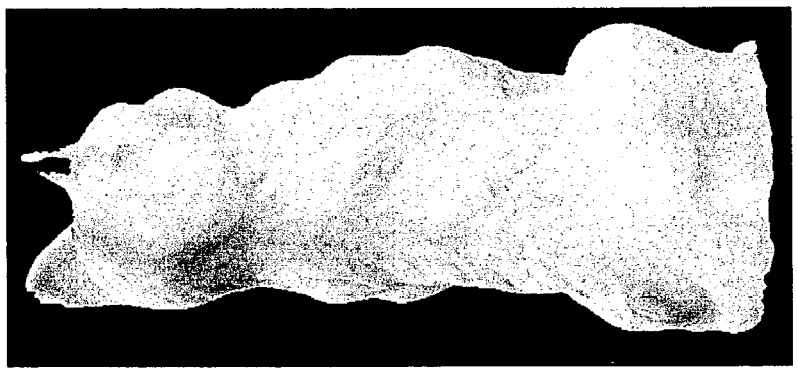
After
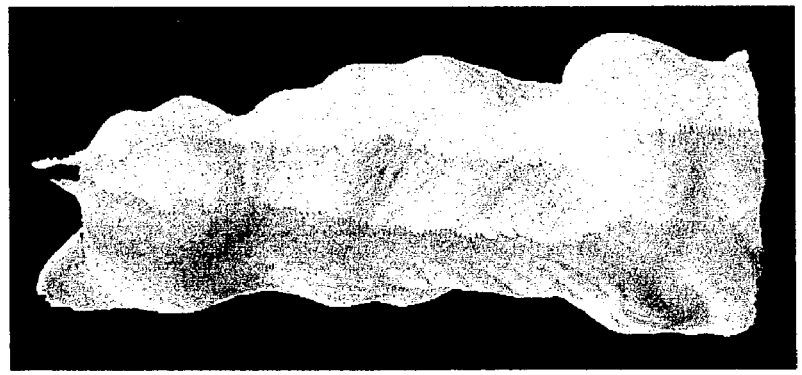
Before
Fig. 11

METHOD OF SEAMLESS PROCESSING FOR MERGING 3D COLOR IMAGES

BACKGROUND OF THE INVENTION

1. Field of Invention

The invention relates to a method of seamless processing for merging 3D color images and, in particular, to a color processing method that achieves seamless effect using the brightness information and maintains the original colors without destroying its textures.

2. Related Art

When making three-dimensional (3D) images, seams are generated when combining two or more images due to the light source effect. This is particularly apparent for color images. Usually, we do not want to destroy the original textures and colors in the images. However, the different display coordinates make it very hard to use the usual planar image processing methods to solve the color difference problem occurring to the seams.

In order to achieve seamless image processing, many methods were proposed. For example, in "Correction for an Image Sequence" (Binh Pham, Glen Pringle, 1995 IEEE), some representative colors are selected in the overlapped area for obtaining a correction matrix to make the color consistent. Nevertheless, in addition to being only applicable to the overlap of two images, the method also has the following drawbacks:

(1) The selected representative colors will affect the correction result. The selection method cannot be widely applied.

(2) When the color difference between two regions is large, the effect will be worse.

(3) Since the colors of two regions are forced to be the same, the real color of the whole image is lost.

(4) Different reference colors have been chosen for different images. They cannot be applied to all images to effectively solve the discontinuity problem.

In "Computing Consistent Normals and Colors from Photometric Data" (H. Rushmeier and F. Bernardini), five light sources are put at different positions. The images are taken for an angle of an object using different light source individually. The five images are then synthesized into a single image with different weights, thereby solving the inhomogeneous problem caused by the light effect. The synthesized image is then merged with other similarly processed images. Thus the discontinuous phenomena around seams have diminished. Additionally, the neighborhood average method is used to solve the remaining discontinuity problem. The method is performed by directly averaging the color information RGB in the overlapped regions. Its shortcomings are:

(1) The seams processed using the proposed method still have lightly discontinuous phenomena.

(2) It is limited by the hardware setup and has a higher cost.

(3) While making a 3D display image, one has to repeatedly take images for five light sources individually for each angle of an object. It is thus very time-consuming.

(4) It still requires software corrections. Moreover, using the neighborhood average method to process the colors is likely to blur the image and loses the reality.

Besides the hardware solution, common technique such as linear or nonlinear weighted averaging performed by software is used to deal with seams at image boundaries. However, they all will blur the images at the edges and lose the detailed textures. Therefore, they are not ideal for the merges of several images or 3D images. The U.S. Pat. No. 6,271,847 warps the images and then blends the warped images using a weighted pyramid feathering scheme. The method works well and makes it possible to create seamless texture maps. However, it is likely to distort the color because it processes images within the RGB color space.

SUMMARY OF THE INVENTION

In view of the foregoing, the invention provides a method of seamless processing for merging 3D color images, which can avoid the discontinuity phenomena occurring as a result of the brightness difference at boundaries and keep the original colors and textures when merging two or more color images.

To keep the original colors and detailed textures in the images, the invention separates the brightness information and uses it to correct, process, and merge images. When merging two or more color images, the discontinuity phenomena that happen as a result of the brightness difference at the merging boundaries caused by inhomogeneous light sources when combining several images are prevented. Therefore, the invention can achieve the seamless effect for merging 3D color images.

In addition, the invention further adopts a two-step correction method. First, the brightness difference of the whole image is corrected. Secondly, the brightness differences at the overlapped boundaries are corrected. The method contains the steps of: (a) providing a plurality of images; (b) computing the brightness differences of the plurality of images and using the computed brightness differences to correct the plurality of images; (c) extracting the images at the merging boundaries from the plurality of images; (d) correcting the brightness at the overlapped boundaries so that the brightness at the edges and seams of the image is the same as that of the nearby image; and (e) recombining the plurality of images.

BRIEF DESCRIPTION OF THE DRAWINGS

The patent or application file contains at least one drawing executed in color. Copies of this patent or patent application publication with color drawings will be provided by the Office upon request and repayment of the necessary fees.

The invention will become more fully understood from the detailed description given herein below illustration only, and thus are not limitative of the present invention, and wherein:

FIGS. 2A to 2C are schematic views of the steps for calibrating the brightness of the whole image according to the invention;

FIG. 6 is a schematic view of the boundary calibration;

FIG. 10 is schematic views of a 3D image model with merging two images before and after being processed using the disclosed method; and FIG. 11 is schematic views of a 3D image model with merging multi images before and after being processed using the disclosed method.

DETAILED DESCRIPTION OF THE INVENTION

Figure 1:
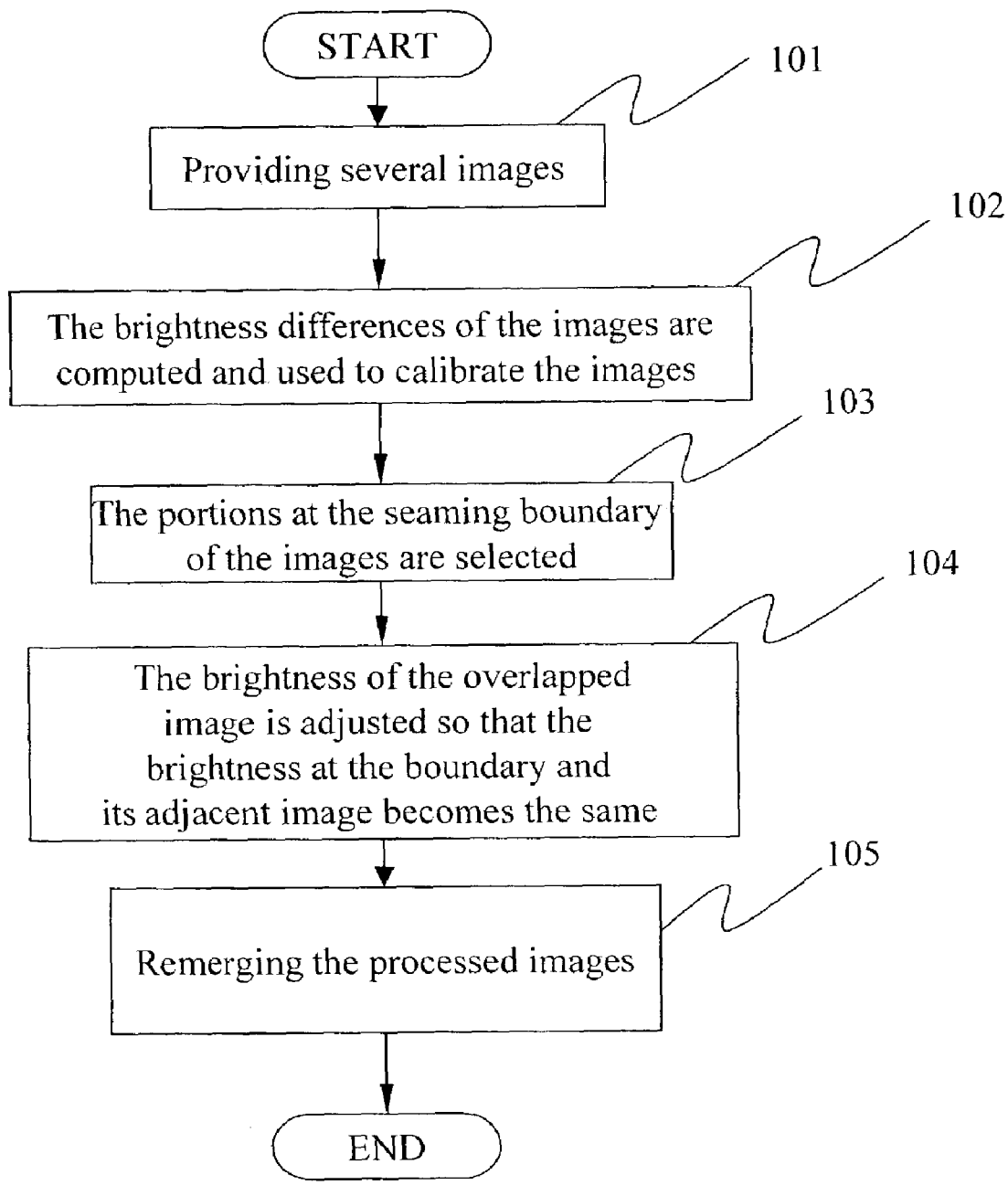
FIG. 1 is a flowchart of the disclosed method.

The invention discloses a method of seamless processing for merging several three-dimensional (3D) color images. With reference to FIG. 1, the method processes the discontinuities in brightness and colors at the seaming boundaries while combining the 3D images. The method starts by providing several images (step 101). The brightness differences of the images are computed and used to calibrate the images (step 102). The portions at the seaming boundary of the images are selected (step 103). The brightness of the overlapped image is adjusted so that the brightness at the boundary and its adjacent image becomes the same (step 104). Finally, the processed images are remerged (step 105). In other words, this two-step calibration first calibrates the brightness difference of the whole image and then processes the boundary of the overlapped image.

Figure 3:
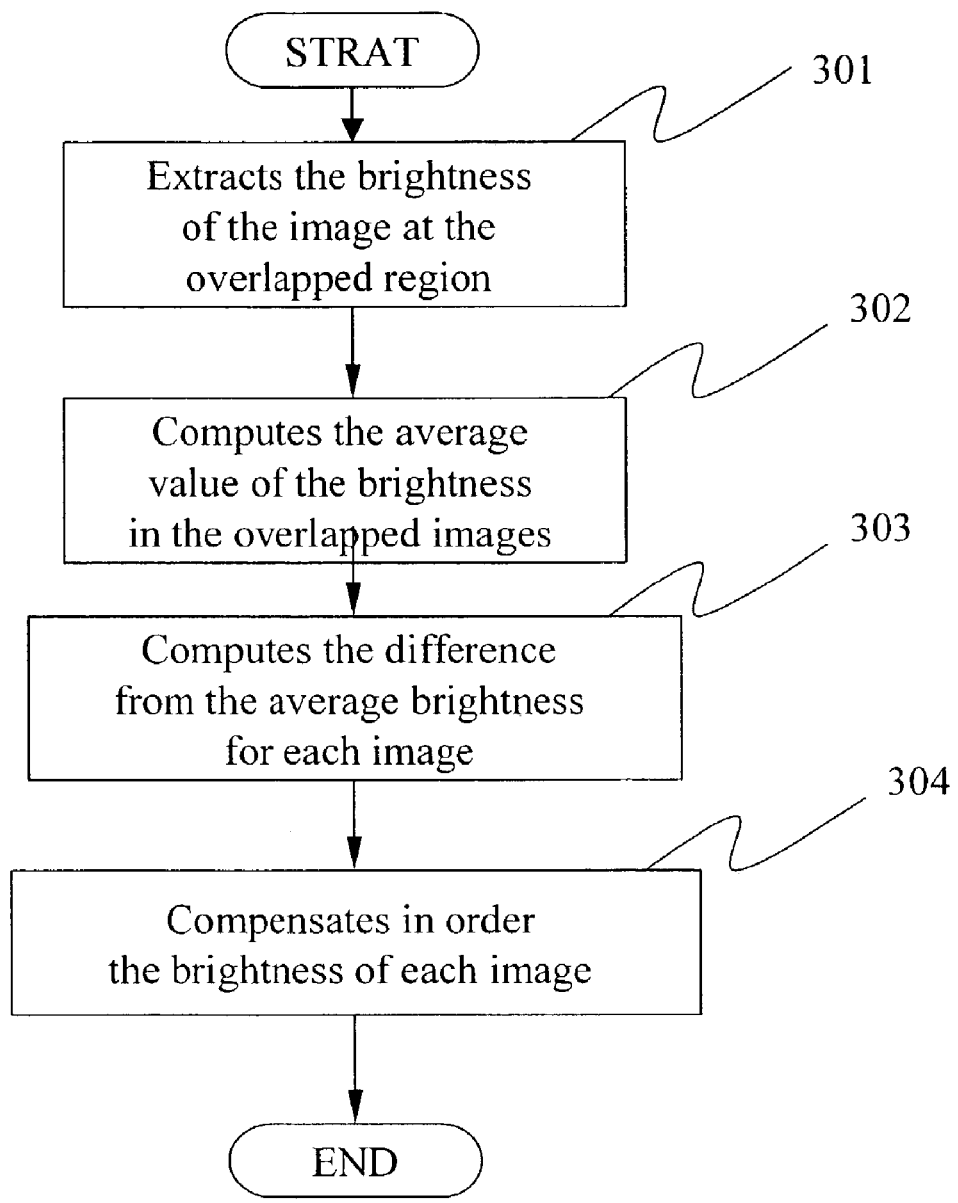
FIG. 3 is a schematic view of a flowchart of calibrating the brightness of the whole image according to the invention.
Figure 4:
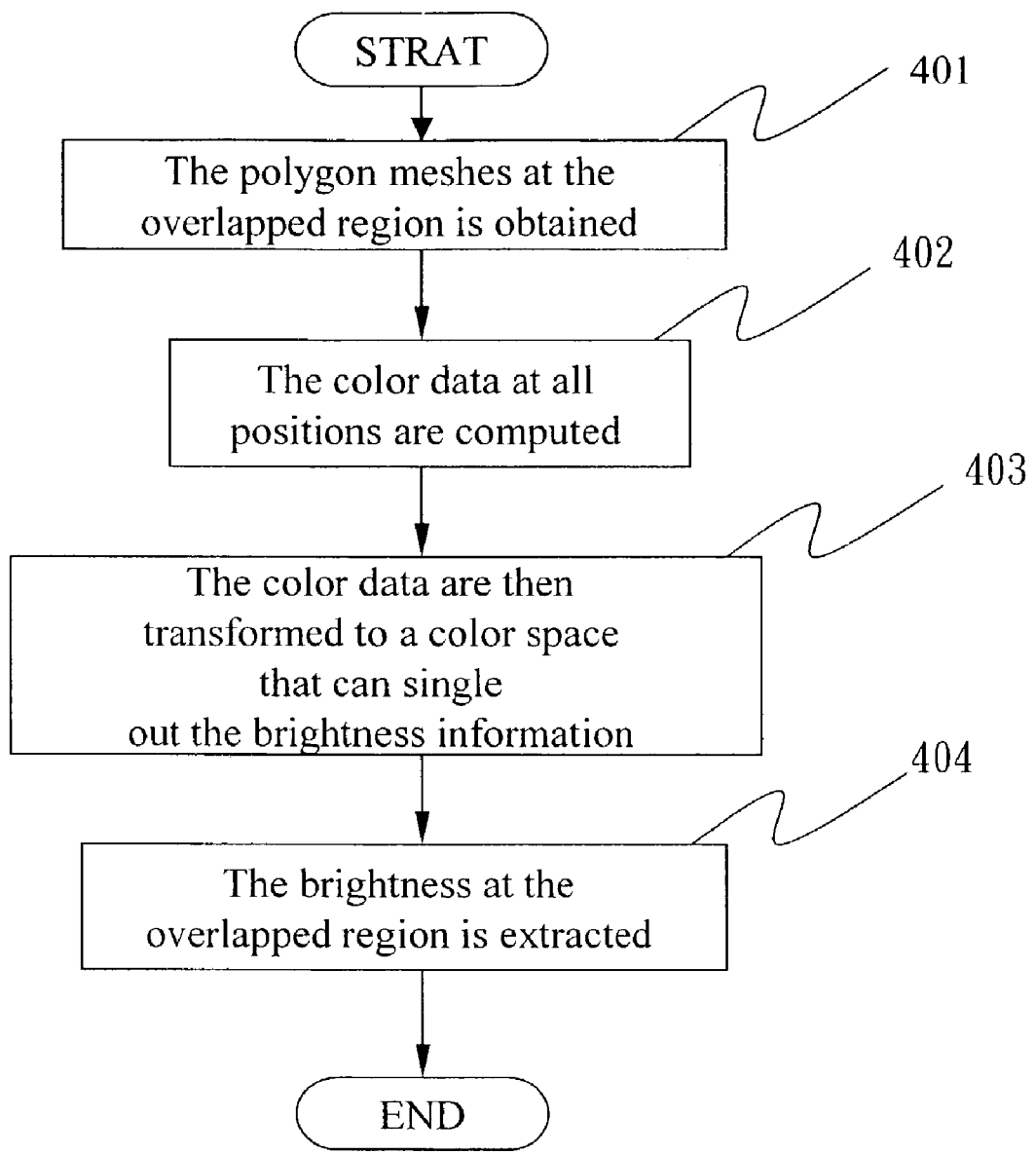
FIG. 4 is a flowchart of extracting the brightness information from the images.

Please refer to FIG. 2A for a detailed description of step 102. At the seaming boundary, there exists a certain brightness difference between two merging images. Ideally, both images have to be adjusted to have a continuous brightness variation (see FIG. 2B) to obtain an optimized image merge. In step 102, the brightness of the whole image is adjusted to reduce the processing area of the subsequent boundary brightness calibration. With reference to FIG. 3, the brightness calibration method first extracts the brightness of the image at the overlapped region (step 301), computes the average value of the brightness in the overlapped images (step 302), computes the difference from the average brightness for each image (step 303), and compensates in order the brightness of each image (step 304). The method of obtaining the image brightness can be done by transforming to another different color space. Its detailed steps are shown in FIG. 4. First, the polygon meshes at the overlapped region are obtained (step 401). Afterwards, the color data at all positions are computed (step 402). The color data are then transformed to a color space coordinate system that can single out the brightness information (step 403). The color space here can be the CIELAB, CIELUV, and YCrCb coordinate systems. Finally, the brightness at the overlapped region is extracted (step 404).

Figure 5:
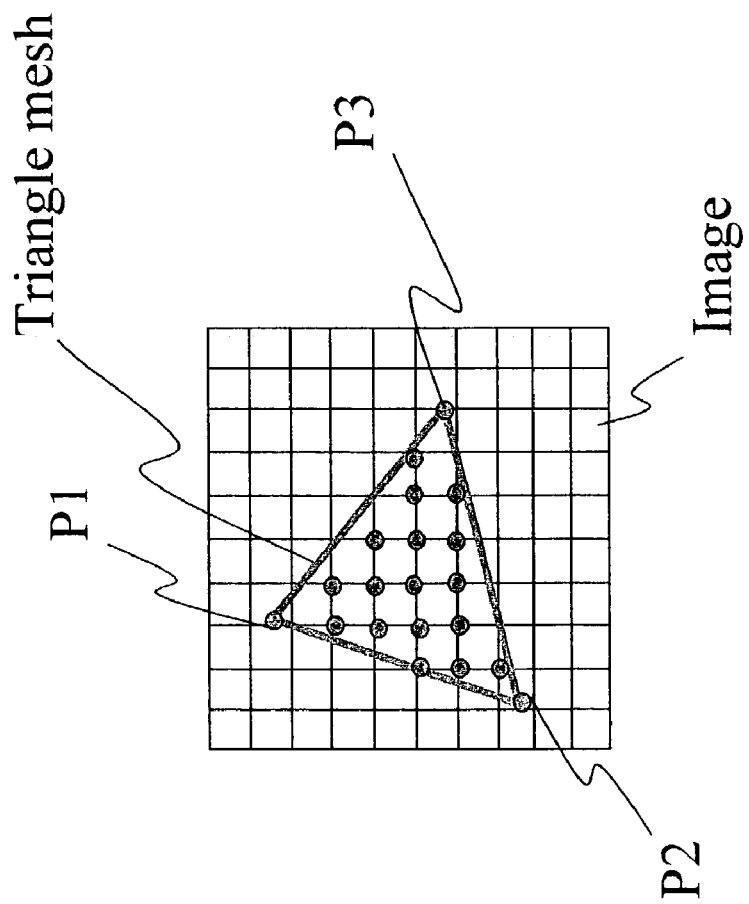
FIG. 5 is a schematic view of the location of a 3D triangle mesh mapped to 2D image.

Please refer to FIG. 5 for the mesh. The position coordinates of the vertices P1, P2, P3 of the mesh in the image are computed from their 3D information. The vertex coordinates are then used to draw a triangular mesh region in the images. The positions of all the points inside the relative meshes are computed for obtaining the color information. The system then computes to obtain an average brightness difference. If there are two images, then it is the average brightness difference of the two images. Each image is added or subtracted with half of the average brightness difference. This gives a preliminary brightness calibration for the whole image (see FIG. 2C). If there are more than three images, then the system processes two images first and uses the synthesized image to combine with the next one in the subsequent steps.

Figure 7:
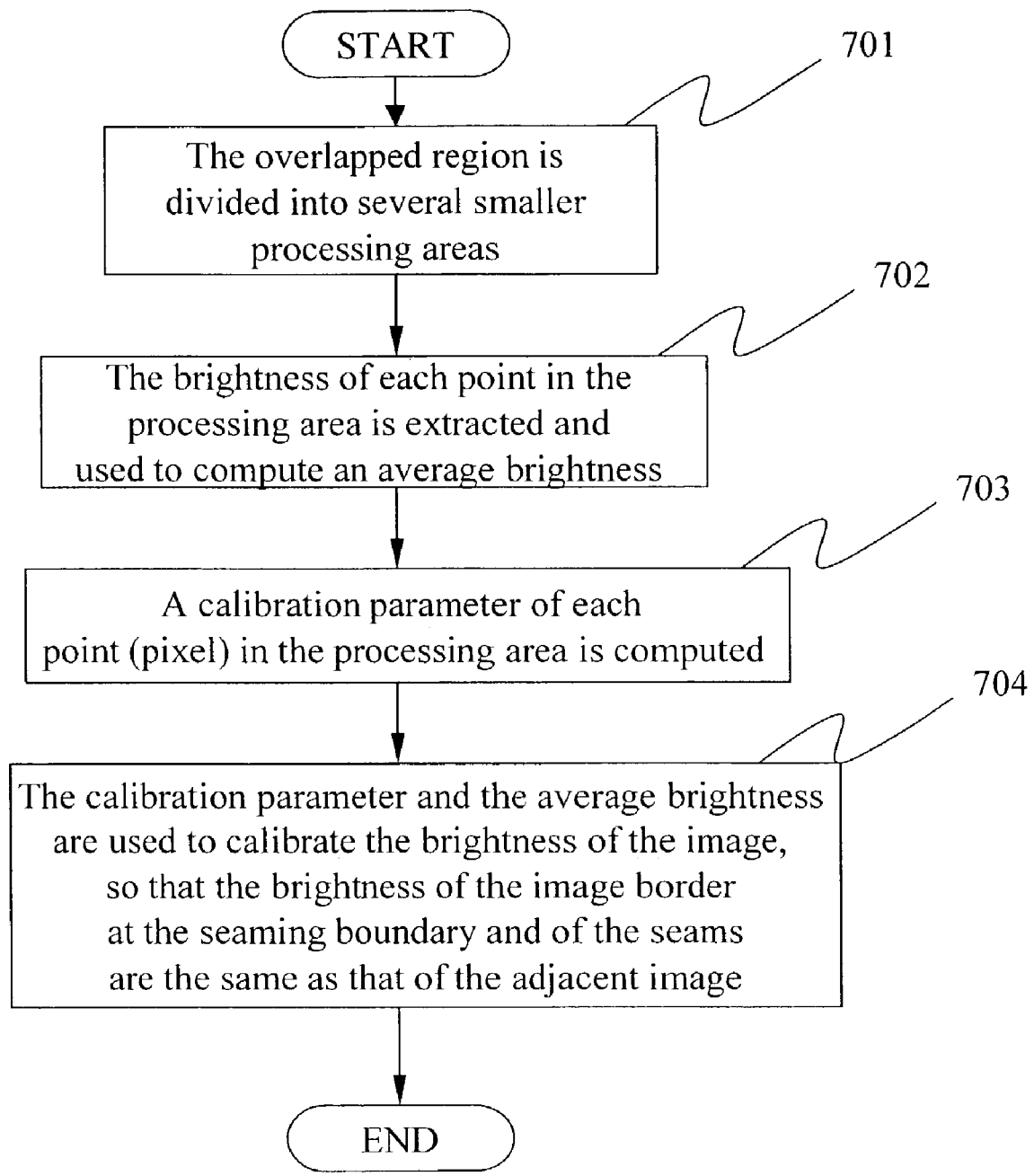
FIG. 7 is a flowchart of calibrating the brightness in the overlapped region.
Figure 9:
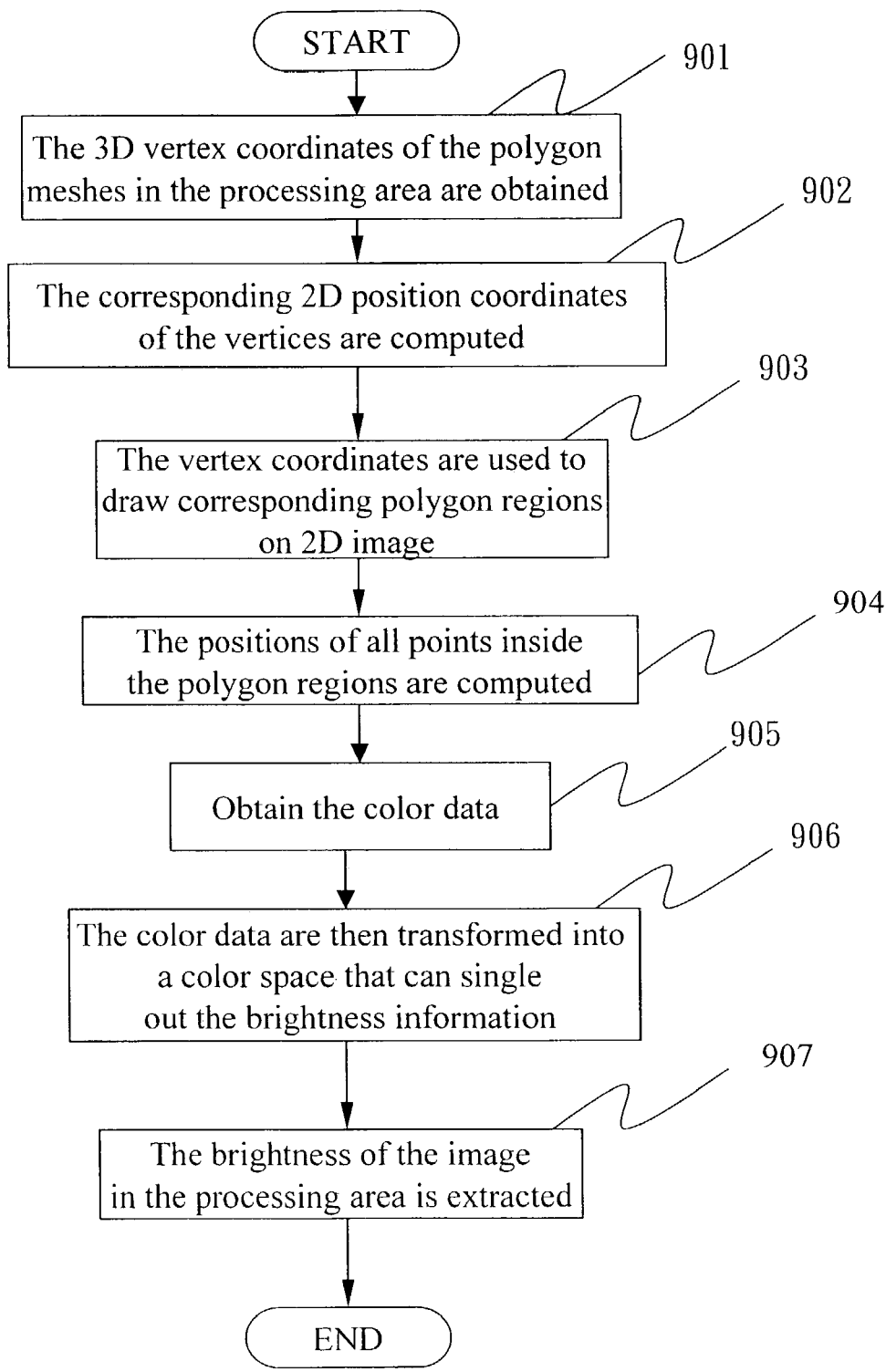
FIG. 9 is a flowchart of extracting the brightness information from the overlapped region.

The second part is the boundary calibration, which mainly calibrates the boundary brightness. As shown in FIG. 7, the overlapped region that has been processed with the overall image brightness calibration is divided into several smaller processing areas (step 701). The purpose of division is to enhance the image processing effect. The number of divided parts can be determined according to practical needs. The brightness of each point in the processing area is extracted and used to compute an average brightness (step 702). A calibration parameter of each point (pixel) in the processing area is computed (step 703). Finally, the calibration parameter and the average brightness are used to calibrate the brightness of the image, so that the brightness of the image border at the seaming boundary and of the seams are the same as that of the adjacent image (step 704). As shown in FIG. 9, the vertex coordinates of the polygon meshes in the processing area are obtained (step 901). The corresponding position coordinates of vertices in the processing area are computed (step 902). The vertex coordinates are used to draw a triangular mesh region in the processing area (step 903). The positions of all points inside the region are computed (step 904) to obtain the color data (step 905). The color data are then transformed into a color space that can single out the brightness information (step 906). The brightness of the image in the processing area is extracted (step 907). This method is similar to that in the previous paragraph and, therefore, not repeated herein.

Figure 8:
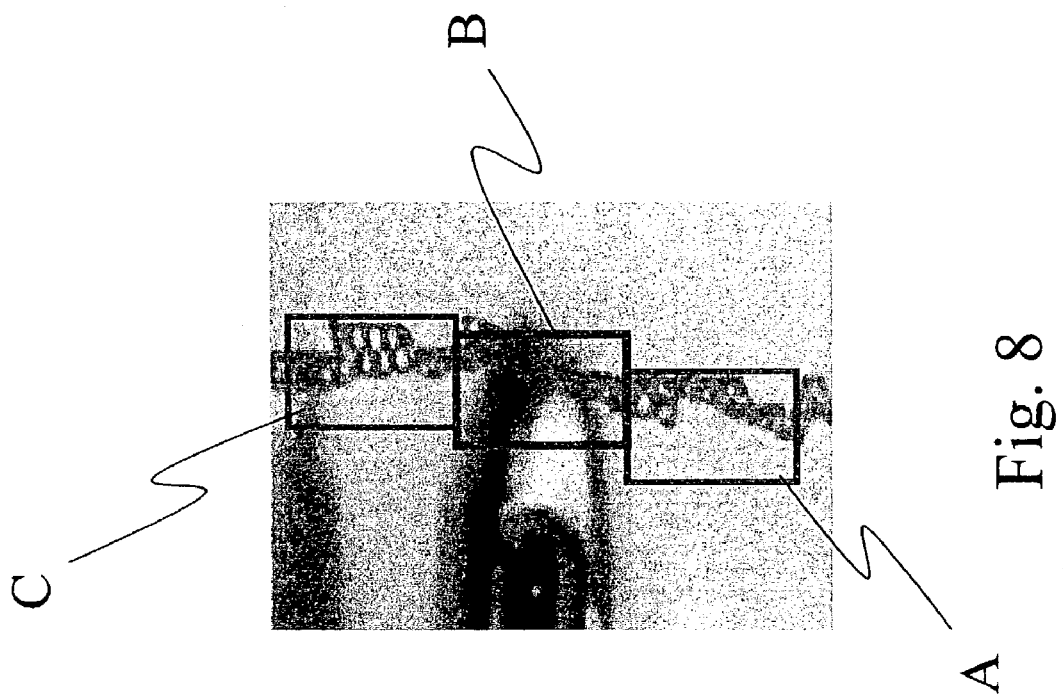
FIG. 8 is a schematic view of processing a smaller area using the invention

The calibration parameter can be $(1-(d(x,y)/D))W$, where D is the processing range (see FIG. 6), $d(x,y)$ is the distance from the processing pixel to the seaming boundary, and $W = c_1 \sigma_{m-1} + c_2 \sigma_m + c_3 \sigma_{m+1}$. The parameters $\sigma_{m-1}$, $\sigma_m$, $\sigma_{m+1}$ are the average brightness differences of the processing area B and the adjacent processing areas A and C (see processing areas A, B, and C in FIG. 8); $c_1, c_2, c_3$ are the corresponding position parameters. In words, the closer the point is to the adjacent areas or boundary, the less calibration there is. Finally, the final brightness is obtained by subtracting the calibration parameter from the brightness obtained from the first calibration. Since this is obtained using the distance of the processing area from its adjacent area and the brightness thereof, there is no brightness difference between two processing areas or in the overlapped region. At the same time, we only use the brightness to perform calibration, the colors and detailed textures in the original image can be maintained. As FIG. 10, it shows schematic views of two 3D images before and after being processed using the disclosed method. It is clearly seen that the effect of the invention on the image. As FIG. 11, it shows the merging of multiple 3D images using the same method. Moreover, the invention has the following advantages:

(1) Under different color spaces, only the brightness is calibrated and the original colors of the image are not changed.

(2) The total brightness of two images is first calibrated to reduce the brightness difference at the seaming boundary. It can reduce the distortion in the processing area.

(3) The brightness difference at the overlapped region is taken as the input of a conversion function to calibrate the image near the overlapped region. This can keep the contrast of the image and so avoid a blurred image and effectively solve the discontinuity problem.

(4) It is automatically executed by a program. The method is simple, convenient and applicable to all images.

Although the above description uses 3D images as the example, the method can be applied to 2D images or those in other dimensions.

Certain variations would be apparent to those skilled in the art, which variations are considered within the spirit and scope of the claimed invention.

What is claimed is:

1. A method of seamless processing for merging three-dimensional (3D) color images to process discontinuities of brightness and colors at seaming boundaries when merging a plurality of 3D images, the method comprising the steps of:
   (a) providing a plurality of images;
   (b) computing a brightness difference of the plurality of images and using the brightness difference to calibrate the images;
   (c) getting overlapped regions of the plurality of images at the seaming boundary;
   (d) calibrating the brightness of an overlapped region and matching the brightness of the seaming boundary and the seam with that of the adjacent image, wherein step (d) comprises the steps of;
      I. dividing the overlapped region into a plurality of smaller processing areas;
      II. extracting the brightness of all points in a processing area and computing its average brightness;
      III. computing a calibrating parameter of each point in the processing area; and
      IV. using the calibration parameter and the average brightness to calibrate the brightness of the image, so that the brightness of the seaming boundary and the seam matches with that of the adjacent images, and
   (e) remerging the plurality of images;
   wherein the calibration parameter is obtained using the distance between the processing area and its adjacent area and the brightness thereof, and
   wherein the calibration parameter is determined using the following function: $(1-(d(x,y)/D))W$, where D is the processing range, $d(x,y)$ is the distance from the processing pixel to the seaming boundary, and $W=c_1\sigma_{m-1}+c_2\sigma_m+c_3\sigma_{m+1}$, the parameter $\sigma_{m-1}$, $\sigma_m$, $\sigma_{m+1}$ being the average brightness of the processing area and its adjacent processing areas and $c_1, c_2, c_3$ the corresponding position parameters.

2. The method of claim 1, wherein step (b) uses a color space coordinate transformation to single out the brightness information of the image.

3. The method of claim 2, wherein the color space coordinate is selected from the group consisting of the CIELAB, CIELUV, and YCrCb color space coordinates.

4. The method of claim 1, wherein step (b) further comprises the step of:
   (i) extracting the brightness of an image in the plurality of images at the overlapped region;
   (ii) computing an average brightness in the overlapped region;
   (iii) computing a brightness difference from the average brightness; and
   (iv) using the brightness difference to calibrate the image.

5. The method of claim 4, wherein step (i) comprises the steps of: obtaining an image grid in the overlapped region; computing the corresponding position and color data; transforming the color data to a color space that allows the extraction of the bright information from the color information; and obtaining the brightness of the overlapped region.

6. The method of claim 5, wherein the step of computing the corresponding position and color data is achieved by: using vertex coordinates of the mesh to compute the corresponding position coordinates in the plurality of images, using the vertex coordinates to draw a polygon region in the image, computing the positions of all points in the polygon region, and obtaining the color data.

7. The method of claim 1, wherein the step of extracting the brightness of all points in a processing area in step II comprises the steps of:
   obtaining the 3D vertex coordinates of the polygon meshes in the processing area;
   obtaining the corresponding 2D position coordinates in the processing area;
   using the vertex coordinates to draw the corresponding polygon regions in the processing area of 2D image;
   computing the positions of all points in the polygon regions;
   extracting the color data in the processing area;
   transforming the color data to a color space that allows the extraction of the brightness information; and
   obtaining the brightness of the image in the processing area.

* * * * *